United States Patent [19]

Ellerstein

[11] 4,190,625
[45] Feb. 26, 1980

[54] THERMOPLASTIC ELASTIC POLYSULFIDE POLYMERS

[75] Inventor: Stuart M. Ellerstein, Princeton, N.J.

[73] Assignee: Thiokol Corporation, Newtown, Pa.

[21] Appl. No.: 921,299

[22] Filed: Jul. 3, 1978

Related U.S. Application Data

[63] Continuation-in-part of Ser. No. 704,010, Jul. 9, 1976, abandoned.

[51] Int. Cl.² ................................................ B28B 3/20
[52] U.S. Cl. .................................. 264/176 R; 264/236; 264/331; 264/347; 427/355; 528/374; 528/373; 528/388
[58] Field of Search .................. 528/374, 388, 373; 264/176, 236, 331, 347; 427/355

[56] References Cited

U.S. PATENT DOCUMENTS

| | | | |
|---|---|---|---|
| 2,195,380 | 3/1940 | Patrick | 260/29.2 R |
| 2,466,963 | 4/1949 | Patrick et al. | 260/838 |
| 3,225,017 | 12/1965 | Seegman et al. | 528/374 |
| 3,499,864 | 3/1970 | Millen | 528/374 |

*Primary Examiner*—Melvyn I. Marquis
*Attorney, Agent, or Firm*—Stanley A. Marcus; Royal E. Bright

[57] ABSTRACT

Polysulfide rubber formulations that become fluid at elevated temperatures but regain the rubbery state upon cooling are disclosed. The products possess a lower permanent set at room temperature and process more easily, particularly in extrusion processes, at elevated temperatures.

1 Claim, No Drawings

THERMOPLASTIC ELASTIC POLYSULFIDE POLYMERS

CROSS REFERENCE TO COPENDING APPLICATION

This application is a continuation-in-part of application, Ser. No. 704,010, filed July 9, 1976, now abandoned.

BACKGROUND OF THE INVENTION

Polysulfide rubbers are elastomeric solids which degrade on heating to elevated temperatures and also degrade when heated in the presence of traces of acid or base. These rubbers which are prepared by the reaction between alkali metal polysulfides and $\alpha,\omega$-dihalo organic compounds have the general backbone structure:

$$\ldots RS_xRS_xR \ldots$$

wherein R is an organic moiety derived by removal of the halogens from an $\alpha,\omega$-dihalo organic compound and x may range from about 1.8 to about 4.0, may have crosslinking introduced at random intervals through use of a small percentage of trihalide in the synthesis reaction, and may be either hydroxyl or thiol terminated. Polysulfide rubbers from the original synthesis are considered by the art to be hydroxyl terminated whereas those whose molecular weight has been reduced by the well-known process of splitting of some of the polysulfide links are considered by the art to be thiol terminated. Optimum properties of polysulfide rubbers are attained, as they are in natural rubber, by curing. The common curing agent for hydroxyl terminated polysulfide rubbers is zinc oxide. Oxidative cures are commonly used for thiol terminated polysulfide polymers, both the solid rubbers and the liquid polymers, although zinc oxide has been employed with these polymers also. The art has always considered that these cured rubbers were no different from the uncured rubbers in their lack of thermoplasticity especially in the presence of acids or bases. This lack of thermoplasticity of cured rubbers was always considered to be analogous to other cured or vulcanized rubbers which cannot be subjected to heat or pressure without undergoing a fundamental molecular degradation with loss of their original physical properties.

This is, of course, in contrast to the class of thermoplastic engineering resins as represented by poly(-phenylenemono sulfide) which are not vulcanized and which can repeatedly be remelted and shaped without molecular alteration.

Strong base is known to degrade sulfide bonds forming various sulfide, sulfonate and sulfinate salts, and in the presence of oxygen, potassium hydroxide in particular is known to promote the oxidation of thiols to disulfides.

Solid polysulfide rubbers are known to have been prepared as latices in the presence of water soluble strong base such as sodium hydroxide, see U.S. Pat. No. 2,195,380 for example, but the subsequent water washing removes water soluble impurities, including any strong base present. Subsequent processing and cure removes any base not removed during the wash step so that essentially none of the base present during initial crude polymer formation is present in the final cured product.

The use of sodium or potassium hydroxide as deliquescent desiccating agents for use in "one package" cures of liquid polysulfide polymer based sealants is suggested in U.S. Pat. No. 3,225,017. There is no teaching or suggestion that the use of these particular deliquescent desiccants results in properties any different from the other compositions disclosed. U.S. Pat. No. 3,046,248 discloses the use of metal hydroxides including lithium hydroxide to cure liquid polysulfide polymers for making dental impressions. No teaching or suggestion that the presence of this particular alkali metal hydroxide affects thermoplasticity is contained in this patent.

The present invention is concerned with the unexpected finding that the incorporation of a catalytic amount of strong based into a cured solid polysulfide rubber induces softening on heating to a much greater degree than an untreated cured product followed by reversion to a rubbery solid possessing substantially the properties of the original on cooling.

SUMMARY OF THE INVENTION

The invention provides a thermoplastic, elastomeric composition which comprises:

a. a zinc oxide cured polysulfide rubber derived from a solid polysulfide crude rubber having sulfur linkages averaging at least 1.8 sulfur atoms per linkage unit; and b. a catalytic amount of an alkali metal hydroxide.

The tangible embodiments of this aspect of the invention process the inherent applied use characteristics of being elastomeric solids which melt upon heating to elevated temperatures thereby evidencing their usefulness in the production of elastomeric articles, such as hoses, by extrusion processes.

The invention still further provides an article of manufacture prepared by extruding a cured polysulfide rubber, said polysulfide rubber having sulfur linkages averaging at least 1.8 sulfur atoms per linkage unit, and containing a catalytic amount of an alkali metal hydroxide, through a die under heat and pressure and allowing the extrudate to cool to room temperature.

DESCRIPTION OF THE PREFERRED EMBODIMENT

The thermoplastic elastomers of the invention may be prepared by compounding a crude polysulfide rubber with an alkali metal hydroxide and a curing agent. Other conventional compounding ingredients may be included if desired. For example, a solid polysulfide copolymer derived from ethylene dichloride, and bis-2-chloroethyl formal, carbon black, stearic acid, a zinc chloride complex of mercaptobenzothiazole disulfide, diphenylguanidine, zinc oxide, and potassium hydroxide are compounded together and cured. The exact time and temperature of the compounding are not especially critical, the proportions of the ingredients, including the curing agent, are also not especially critical and those known to the art for the conventional compounding ingredients so as to give the desired physical properties may be employed, the catalytic amount of alkali metal hydroxide may be of any of the common alkali metal hydroxides, such as lithium, sodium, potassium or cesium hydroxides, and it may be employed in a concentration of from about 0.4 to about 5.0 preferably about 0.5 to 1.0 parts by weight of hydroxide to about 100 parts by weight of the polysulfide crude rubber. One skilled in the art will recognize that in addition to the ethylene dichloride, bis-2-chloroethyl formal polysulfide copolymer illustrated, it will be possible to employ any of the polysulfide rubbers commonly available or known in the literature. The typical polysulfide polymers which are usable are described by Fettes and Jorczak in Industrial and Engineering Chemistry, Vol. 42, page 2217 (1950), and Industrial and Engineering Chemistry, Vol. 43, page 324 (1951).

The cure of the compounded crude polysulfide rubber-alkali metal hydroxide mixture may be accomplished in the usual fashion. The cure is normally performed with the addition of heat and the application of pressure. The exact heat and pressure are not particularly critical and will readily be selected by one skilled in the art based upon the type of polysulfide crude rubber employed, the conventional compounding ingredients employed and the desired final properties. It has however been found that the presence of water in excess of that normally found in the individual ingredients entering into the compounded uncured product will retard cure and lead to voids and blisters in the cured product.

Extrusion of the cured products may be accomplished using standard equipment suitable for the extrusion of other solid thermoplastic elastomers. Standard extrusion dies may be employed and the temperatures and pressures employed will normally be well within the usual working ranges for this type of extrusion.

The extruded products on cooling regain substantially the original properties of the original cured rubber and can be softened and re-extruded and hardened repeatedly without substantial loss of original properties.

The following examples further illustrate the best mode contemplated by the inventor for the practice of his invention.

EXAMPLE 1

Polysulfide polymer based elastomers were compounded of the following ingredients by mixing at 150° C.:

|  | Parts by Weight | |
|---|---|---|
|  | 1 | 2 |
| Polysulfide polymer crude rubber (copolymer derived from ethylene dichloride and bis-2-chloroethyl formal) | 100 | 100 |
| Carbon Black | 60 | 60 |
| Stearic Acid | 0.5 | 0.5 |
| Zinc chloride complex of mercapto-benzothiazole disulfide | 0.3 | 0.3 |
| Diphenyl guanidine | 0.1 | 0.1 |
| Zinc Oxide | 10 | 10 |
| Potassium Hydroxide | — | 0.5 |

Sheets pressed from these formulations for 40 min. at 300° F. and 2000 psi possessed the following properties:

|  | 1 | 2 |
|---|---|---|
| Tensile, psi | 1180 | 1290 |
| Elongation, % | 375 | 205 |
| 100% Modulus | 312 | 700 |
| Duro "A" | 67 | 77 |
| % Set (10 min.) | 13 | 3 |
| Tear pli | 242 | 180 |

Samples of the cured elastomers were extruded through a 1 mm die having length to diameter ratio of 15/1, at 20 minutes the pressures were 6300 psi for #1 and 3700 psi for #2. The extrudate of #2 was less kinky and regained its "snap" on cooling.

EXAMPLE 2

Polysulfide based elastomers were compounded of the following ingredients by mixing at 150° C.

|  | Parts by Weight |
|---|---|
| Polysulfide polymer crude rubber (derived from bis-2-chloroethyl formal and 2% trichoropropane, average S linkages $S_{2.25}$, SH terminated) | 100 |
| Carbon Black | 60 |
| Zinc chloride complex of mercapto-benzothiazole disulfide | 0.3 |
| Diphenyl Guanidine | 0.1 |
| Zinc Peroxide | 3.3 |
| Potassium Hydroxide | 1.7 |

Sheets pressed from this formulation at 150° C. for 30 minutes at 2000 psi possessed the following properties:

| Tensile, psi | 780 |
|---|---|
| Elongation, % | 355 |
| Modulus 100% | 268 |
| Duro "A" | 68 |
| % Set (10 min.) | 6 |
| Tear (pli) | 207 |

A sample of the cured elastomer was extruded as in Example 1 at 15 minutes the pressure was 6800 psi. The extrudate regained its "snap" on cooling.

EXAMPLE 3

Polysulfide polymer based elastomers were compounded of the following ingredients by mixing at 150° C.

|  | Parts by Weight | | | |
|---|---|---|---|---|
|  | 1 | 2 | 3 | 4 |
| Polysulfide polymer crude rubber (as in Example 2) | 100 | 100 | 100 | 100 |
| Carbon Black | 60 | 60 | 60 | 60 |
| Zinc chloride complex of mercapto-benzothiazole disulfide | 0.3 | 0.3 | 0.3 | 0.3 |
| Diphenyl Guanidine | 0.1 | 0.1 | 0.1 | 0.1 |
| Zinc Peroxide | 3.3 | 3.3 | 3.3 | 3.3 |
| Zinc Oxide | — | 6.6 | — | — |
| Potassium Hydroxide | 3.3 | 3.3 | 1.7 | 2.5 |

Sheets pressed from these formulations at 150° C. and 2000 psi for 40 minutes possessed the following properties:

| Tensile, psi | 391 | 384 | 823 | 500 |
|---|---|---|---|---|
| Elongation, % | 443 | 382 | 423 | 387 |
| 100% Mod. | 136 | 180 | 268 | 218 |
| Duro "A" | 55 | 58 | 64 | 60 |
| % Set (10 min.) | 27 | 19 | 10 | 22 |
| Tear pli | 857 | 818 | 219 | 143 |

A sample of each cured elastomer was extruded as in Example 1 at 15 minutes the pressure for #1 was 4500 psi, the pressure for #2 was 3700 psi, the pressure for #3 and #4 was 4700 psi. The extrudate of all 4 samples regained their "snap" on cooling.

The subject matter which applicant regards as his invention is particularly pointed out and distinctly claimed as follows:

1. A process for the preparation of a shaped thermoplastic elastomeric article of manufacture which comprises the extrusion of a cured polysulfide rubber, said polysulfide rubber having sulfur linkages averaging at least 1.8 sulfur atoms per linkage unit and, containing a catalytic amount of an alkali metal hydroxide, through a die under heat and pressure and allowing the extrudate to cool to room temperature.

* * * * *